Oct. 10, 1950     R. E. FRANKS     2,525,171
FRONT WHEEL SUSPENSION
Filed April 29, 1949
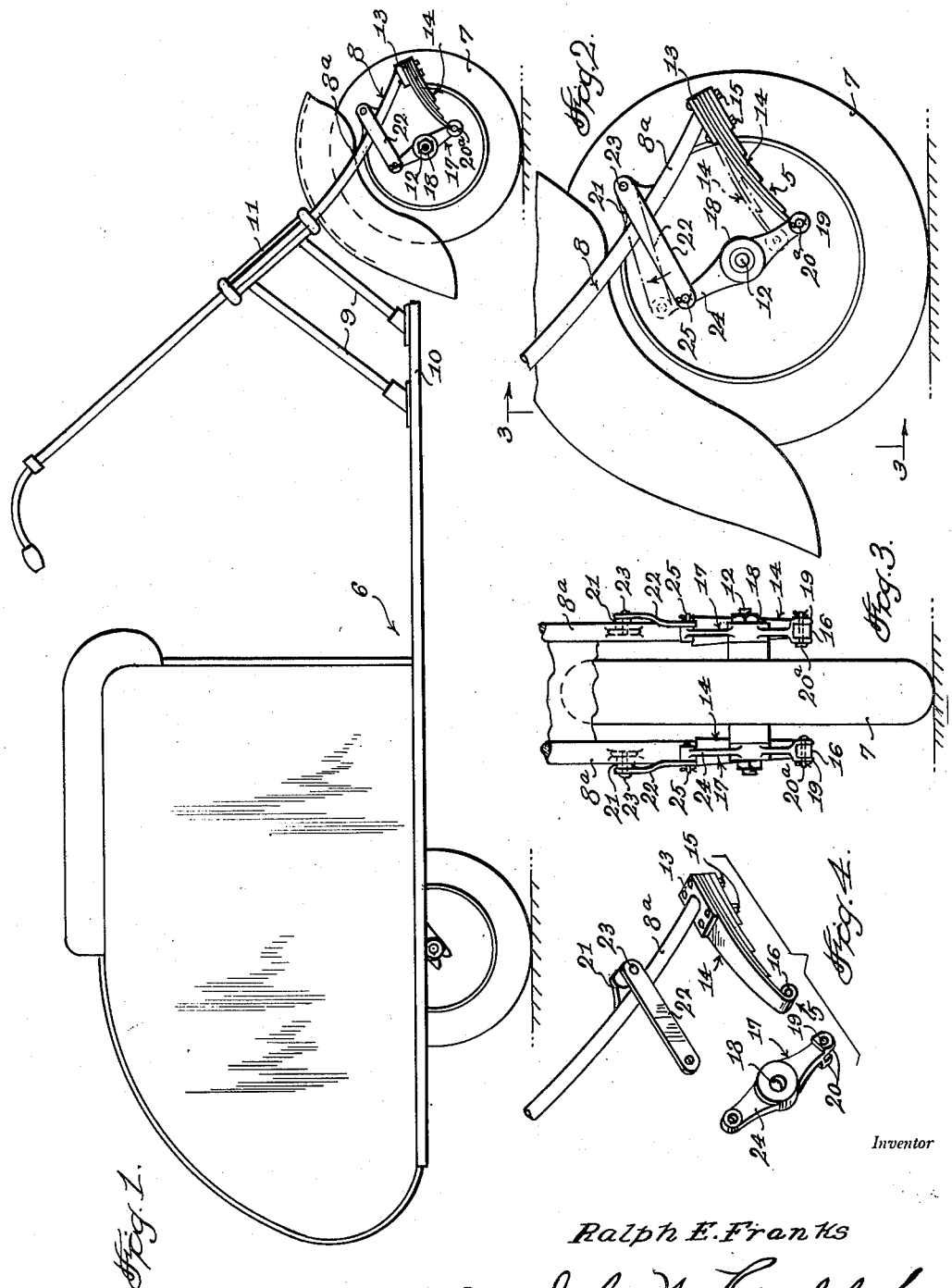
Inventor
Ralph E. Franks
By John N. Randolph
Attorney Patented Oct. 10, 1950

2,525,171

UNITED STATES PATENT OFFICE 2,525,171

FRONT WHEEL SUSPENSION

Ralph E. Franks, Baltimore, Ohio

Application April 29, 1949, Serial No. 90,481

5 Claims. (Cl. 280—277)

This invention relates to a novel form of spring suspension for the front steering wheel of a two wheel vehicle and while adaptable for use on bicycles and motorcycles, it is especially adapted for application to the front steering wheel of a motor scooter and which may be utilized in conjunction with any vehicle having a single front steering wheel, irrespective of the number of rear wheels employed.

While it is well known that spring suspensions have been provided for the single front steering wheels of vehicles, with such suspensions the thrust exerted against the wheel as in striking a hump or depression in a roadway is generally in a rearward and upward direction whereas the spring suspension is arranged to permit the front wheel to yield in an upward direction only. Consequently, such spring suspensions ordinarily are not capable of absorbing any material amount of a road shock occurring when the vehicle is traveling in a forward direction and caused by the front wheel striking a relatively large hole or hump.

Accordingly, it is the primary object of the present invention to provide a spring suspension for a front steering wheel which will permit the front wheel to swing rearwardly and upwardly relatively to the steering fork and whereby the lower ends of the steering fork will be disposed forwardly of the wheel axle so that a direct thrust cannot be exerted through the wheel thereagainst and which could be transmitted to the handle bars of the vehicle.

It is a primary object of the present invention to provide such a structure especially adapted for use on motor scooters which employ relatively small wheels so that the wheel axle is located in close proximity to a road surface over which the vehicle is traveling thereby magnifying the tendency of the wheel to be forced rearwardly in passing over depressions or humps in the roadway and which consequently magnify the vibration to which the front wheel fork, steering post and handle bar is subjected.

Various other objects and advantages of the invention will hereinafter become more fully apparent from the following description of the drawing, illustrating a preferred embodiment thereof, and wherein:

Figure 1 is a side elevational view showing a motor scooter with the novel front wheel suspension applied thereto;

Figure 2 is an enlarged side elevational view of the front wheel and associated parts;

Figure 3 is an end elevational view, with certain of the parts broken away, taken substantially along a plane as indicated by the line 3—3 of Figure 2, and Figure 4 is an exploded perspective view of one of the front wheel suspension units.

Referring more specifically to the drawing, for the purpose of illustrating a preferred application and use of the resilient front wheel suspension, designated generally 5 and comprising the invention, a motor scooter, designated generally 6, is illustrated in Figure 1 to which the front wheel suspension 5 is applied for yieldably mounting the front wheel 7 thereof relatively to the front wheel fork 8. Most of the remaining parts of the motor scooter 6 are of conventional construction and will not be described and details not relating to the invention have been omitted. The motor scooter 6 is provided with brace members 9 which are secured to and extend upwardly and forwardly in converging relationship relatively to one another from the forward end of the scooter platform 10 and which mount a sleeve 11 in which the fork 8 is swively supported.

As clearly illustrated in Figures 1 and 2, the fork 8 instead of being attached directly to the axle 12 of the front wheel 7 extends forwardly thereof and terminates above and substantially forward of the axle 12. The forward end of each arm 8a of the fork 8 is provided with an integral plate or head 13 having an underside disposed in a downwardly and rearwardly inclined position, as best illustrated in Figure 2.

A leaf spring, designated generally 14 is fastened at its enlarged end by nut and bolt fastenings 15 to the underside of the plate 13 and extends rearwardly and downwardly therefrom and is likewise curved downwardly. The individual leaves of the spring 14 are of different lengths, said leaves increasing in length from the lowermost to the uppermost. The uppermost and longest leaf of the spring 14 terminates in a downwardly offset spring eye 16, as best seen in Figure 4.

The suspension 5 also includes an elongated rocker element 17 having an intermediate bearing portion 18 which is journaled on one end of the axle 12 and which may be connected thereto in any conventional manner corresponding to the manner in which the fork arms are normally connected to said axle. The rocker 17 is provided with a bifurcated lower end 19 which straddles the spring eye 16 and the furcations of which are provided with apertures 20 to register with the spring eye 16 for receiving a pin or bolt 20a for pivotally connecting said rocker 17 at its lower end to the free end of the spring 14.

Each fork arm 8a at a point a short distance from and above its head or plate 13 is provided with an upwardly projecting apertured ear 21 to which one end of a link or lever 22 is pivotally connected by a pin or bolt 23. The opposite, upper end of the rocker 17, designated 24, is provided with an aperture in the end thereof located substantially the same distance from the opening of the bearing portion 18 as the apertures 20 and which is connected to the opposite end of the lever 22 by a pivot pin or bolt 25. The lever 22, as clearly illustrated in Figures 1 and 2 is disposed on the outer side of the fork arm 8a to which it is connected and is adapted to swing on its pivot 23 between and possibly beyond its full and dotted line positions of Figure 2.

It will be readily understood, and as illustrated in Figure 3, that a corresponding suspension unit is disposed on each side of the front wheel 7 so that the fork 8a is yieldably supported by two of such units, each including a leaf spring 14, relatively to the front wheel 7.

From the foregoing it will be readily apparent that the rear free end of the leaf springs 14 are capable of yielding upwardly and in so doing will swing upwardly and rearwardly and the long, top leaves of the springs 14, in yielding upwardly, will tend to straighten and extend themselves so as to be displaced rearwardly with respect to the heads or plates 13. When this occurs, the rockers 17 will likewise swing upwardly with the springs 14 as the wheel 7 is displaced upwardly and rearwardly and in so moving will cause the levers 22 to swing upwardly. Said levers 22 function as links for connecting the upper ends of the rockers 17 to the fork arms 8a for steadying and guiding the free ends of the springs 14 and it will be readily apparent that in the movement of each rocker 17 between its normal, full line position of Figure 2 and its dotted line position, when its springs 14 is tensioned, that the rocker 17 will pivot slightly relatively to its link or lever 22 on the pivot 25 and will likewise pivot slightly relatively to the spring 14 on its pivot 20 and to accommodate these pivotal movements, the intermediate portion 18 of said rocker will swing slightly on the wheel axle 12.

It will thus be readily apparent that a novel spring suspension for a single front steering wheel has been provided and which will permit the wheel to yield upwardly and rearwardly in passing over obstructions and relatively to the wheel fork for absorbing substantially all vibration which would otherwise be transmitted through the fork, steering post and handle bars to the arms of the rider. Furthermore, the wheel suspension as aforedescribed will function to absorb road shocks much more readily than other resilient suspensions in that it positions the axis of the wheel behind and below the wheel fork so that the normal upward and rear thrust which is exerted against the front steering wheel as it strikes a depression or hump while traveling in a forward direction will be more readily absorbed since the wheel is capable of yielding not only upwardly but also rearwardly with respect to the wheel fork.

While the invention has been described in connection with a motor scooter to which it is particularly applicable due to the small diameter of the wheels of such vehicles, it will be readily apparent that it is likewise capable of use on other types of vehicles employing a single front steering wheel.

Various modifications and changes are contemplated and may obviously be resorted to, without departing from the spirit or scope of the invention as hereinafter defined by the appended claims.

I claim as my invention:

1. A resilient suspension for the front steering wheel of a wheeled vehicle comprising a front steering wheel fork having laterally spaced fork arms, a front wheel axle, a spring secured to the lower end of each fork arm and extending downwardly and rearwardly therefrom, a rocker having a lower end pivotally connected to the lower free end of each spring and extending upwardly therefrom, a rigid link having one end pivotally connected to the upper end of each rocker and extending upwardly and forwardly therefrom and pivotally connected at its opposite end to the complementary fork arm, and said rocker having an intermediate bearing portion journaled on an end of the front wheel axle.

2. A resilient wheel suspension as in claim 1, said spring comprising a leaf spring having a plurality of leaves of different lengths, the uppermost and longest of said leaves being connected at its free end to the lower end of the rocker and said leaf spring being curved downwardly from its secured end to its free end.

3. A resilient front steering wheel suspension comprising a front steering wheel fork having laterally spaced fork arms, a front wheel axle, corresponding suspension units each attached to one arm of the wheel fork and to one end of the wheel axle and including an elongated rocker member journaled intermediate of its ends on an end of the wheel axle, a spring having one end fixedly secured to the fork arm and extending rearwardly therefrom and pivotally connected at its opposite end to one end of the rocker, and a rigid link pivotally connected at one of its ends to said fork arm and extending rearwardly therefrom and pivotally connected at its opposite end to the other end of said rocker.

4. A resilient front wheel suspension as in claim 3, said link being disposed above the spring.

5. A resilient wheel suspension as in claim 3, said springs and links being normally disposed substantially parallel and extending downwardly and rearwardly from the fork arm, and said rocker being normally disposed substantially perpendicular to the spring and link.

RALPH E. FRANKS.

REFERENCES CITED

The following references are of record in the file of this patent:

UNITED STATES PATENTS

| Number | Name | Date |
| --- | --- | --- |
| 1,121,168 | Cobb | Dec. 15, 1914 |
| 1,163,103 | Myers | Dec. 7, 1915 |
| 1,485,935 | MacLean | Mar. 4, 1924 |
| 1,694,305 | Ascarelli | Dec. 4, 1928 |

FOREIGN PATENTS

| Number | Country | Date |
| --- | --- | --- |
| 5,434 | Great Britain | Apr. 10, 1915 |